(12) United States Patent
West

(10) Patent No.: US 8,789,650 B2
(45) Date of Patent: Jul. 29, 2014

(54) AIR CONDITIONING SYSTEM EXHAUST SILENCER FOR AN AIRCRAFT

(75) Inventor: Nicholas West, Berkeley Glos (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/552,192

(22) Filed: Jul. 18, 2012

(65) Prior Publication Data

US 2013/0025963 A1 Jan. 31, 2013

(30) Foreign Application Priority Data

Jul. 28, 2011 (GB) .................................. 1113034.1

(51) Int. Cl.
*E04F 17/04* (2006.01)
(52) U.S. Cl.
USPC .......................................................... 181/224
(58) Field of Classification Search
USPC .............. 181/224, 225, 229; 454/71; 244/1 N
See application file for complete search history.

(56) References Cited

U.S. PATENT DOCUMENTS

| | | | | |
|---|---|---|---|---|
| 4,109,753 | A * | 8/1978 | Lyman ........................... | 181/252 |
| 6,253,873 | B1 * | 7/2001 | Norres et al. .................. | 181/224 |
| 7,546,899 | B2 * | 6/2009 | Tomerlin et al. .............. | 181/252 |
| 7,631,726 | B2 * | 12/2009 | McWilliam et al. .......... | 181/258 |
| 7,815,012 | B2 * | 10/2010 | Holmgren et al. ............ | 181/224 |
| 2008/0230306 | A1 * | 9/2008 | Ichikawa ....................... | 181/229 |
| 2008/0230307 | A1 * | 9/2008 | Matsumoto et al. .......... | 181/229 |
| 2009/0200103 | A1 * | 8/2009 | Potschka ....................... | 181/224 |
| 2010/0077754 | A1 * | 4/2010 | Jangili ............................ | 60/725 |
| 2010/0077755 | A1 * | 4/2010 | Jangili et al. ................... | 60/725 |
| 2010/0122869 | A1 * | 5/2010 | Sengissen et al. ............. | 181/264 |
| 2010/0307863 | A1 | 12/2010 | Van De Flier et al. | |
| 2012/0267476 | A1 * | 10/2012 | Thomas ........................ | 244/1 N |

FOREIGN PATENT DOCUMENTS

| | | |
|---|---|---|
| BR | 8501482 | 3/1985 |
| DE | 102009058227 A1 * | 6/2011 |
| GB | 2366836 | 3/2002 |
| JP | 5838315 | 3/1983 |

OTHER PUBLICATIONS

UK Search Report for Application No. 1113034.1 mailed Oct. 31, 2011.

* cited by examiner

*Primary Examiner* — Jeremy Luks

(74) *Attorney, Agent, or Firm* — Lowe Hauptman & Ham, LLP

(57) ABSTRACT

An exhaust silencer for the air conditioning system of an aircraft is disclosed.

13 Claims, 5 Drawing Sheets

AIR CONDITIONING SYSTEM EXHAUST SILENCER FOR AN AIRCRAFT

RELATED APPLICATIONS

The present application is based on, and claims priority from, Great Britain Application Number 1113034.1, filed Jul. 28, 2011, the disclosure of which is hereby incorporated by reference herein in its entirety.

FIELD OF INVENTION

The present invention relates to an air conditioning system exhaust silencer for an aircraft.

BACKGROUND OF THE INVENTION

Aircraft have air conditioning (AC) systems for providing conditioned air for crew and passenger. AC systems have one or more exhaust air outputs which commonly comprise exhaust silencers. Such silencers are arranged to reduce the noise of the AC exhaust air output and need also to cope with significant thermal loads.

Aircraft AC exhaust silencers are traditionally made from high specification aerospace metals such as Titanium or Aluminium alloys in enable them to cope with an appropriate range of operating temperatures. As a result, aircraft AC exhaust silencers are expensive, heavy and complex to manufacture.

SUMMARY OF THE INVENTION

An embodiment of the invention provides an air conditioning exhaust silencer for an aircraft, the silencer comprising:
a pressure vessel having an input port and an output port, the pressure vessel being formed from high temperature synthetic composite material;
a perforated conduit running through the pressure vessel between the input port and the output port; and
an acoustic absorption layer arranged between the outer surface of the perforated conduit and the interior surface of the pressure vessel.

The perforated conduit may be formed from high temperature metal alloy. The air conditioning exhaust silencer may comprise a thermal layer arranged exterior to the pressure vessel. The wall of the pressure vessel may comprise a cavity and the thermal layer is arranged within the cavity. The cavity may comprise one or more vents arranged to provide fluid communication between the interior of the cavity and the exterior of the pressure vessel so as to provide a leak path. The perforated conduit may be fixed to the pressure vessel at a first joint adjacent the input port and a second joint adjacent the output port. The first or second joints may comprise expansion joints.

One or more fixing points may be provided for fixing the pressure vessel to the perforated conduit. The fixing points may be provided by an inward diversion of the wall of the pressure vessel to adjacent the perforated conduit so as to enable the fixing of the pressure vessel to the perforated conduit. The fixing points may each comprise an expansion joint. The inward diversion of the wall may be provided with sealing means arranged to provide fluid sealing between the fixing point and the exterior of the pressure vessel.

The air conditioning exhaust silencer may comprise one or more guide vanes arranged within the perforated conduit for guiding fluid flow through the air conditioning exhaust silencer. One or more fixing points may provided between the input port and the output port for fixing the pressure vessel to the perforated conduit in combination with fixing the or each vane within the air conditioning exhaust silencer. The pressure vessel may be formed from a plurality of parts fixed together around the perforated conduit.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
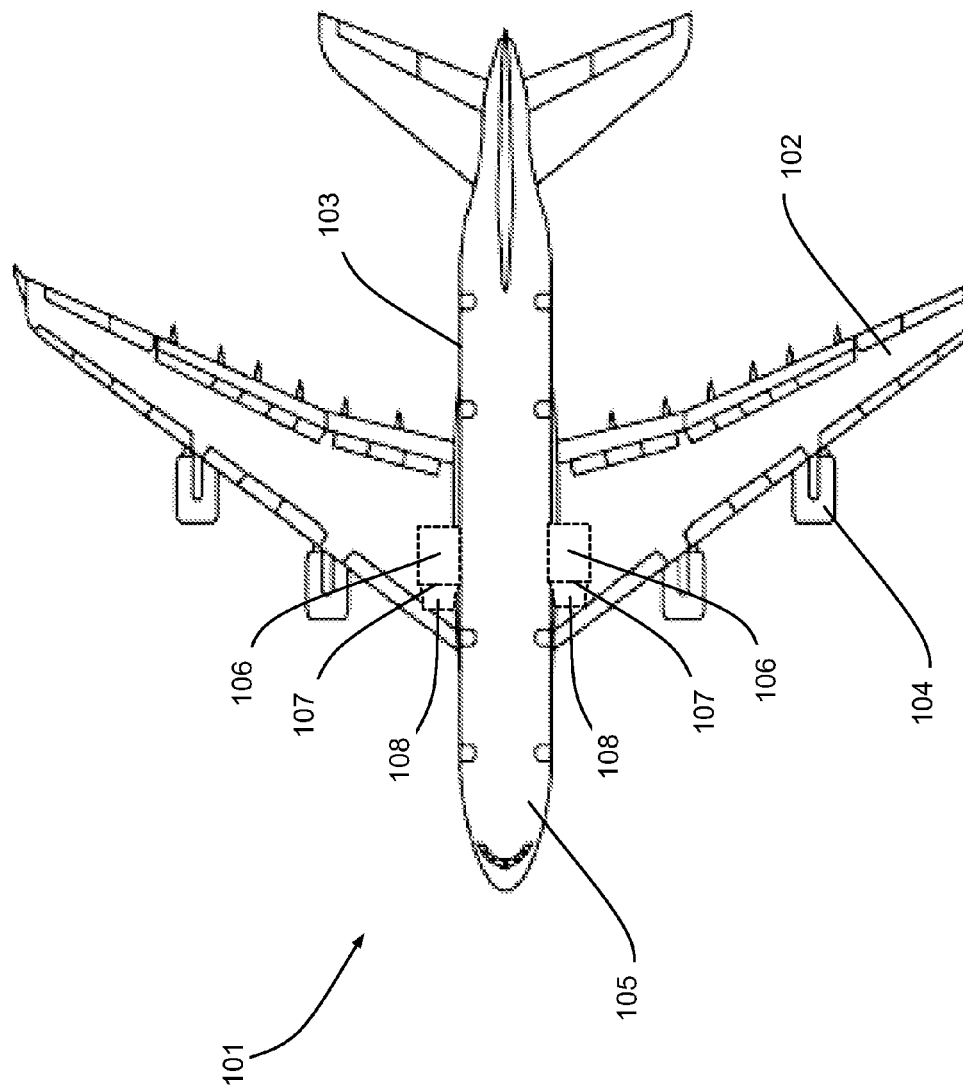
FIG. 1 is a schematic illustration of an aircraft comprising an air conditioning system.

With reference to FIG. 1, an aircraft 101 comprises a pair of wings 102 faired into a fuselage 103. Each wing 102 carries two engines 104. The fuselage 103 comprises a cabin 105 for passengers and crew. In the present embodiment, two air conditioning (AC) plants 106 are arranged to provide conditioned air to the cabin 105. Each plant 106 has two exhausts 107 for outputting waste hot air from the plant 106 overboard to atmosphere. Each exhaust 107 is thus vented outside the aircraft 101 via respective ram air outlets (not shown) located on the underside of the respective wing 102. Each exhaust 107 is provided with an in-line silencer 108 arranged to attenuate the noise of the exhaust airflow. In the present embodiment, four silencers 108 are provided, one for each exhaust 107. In the present embodiment, the silencers 108 are located within the inner leading edge of the wing 102.

Figure 2:
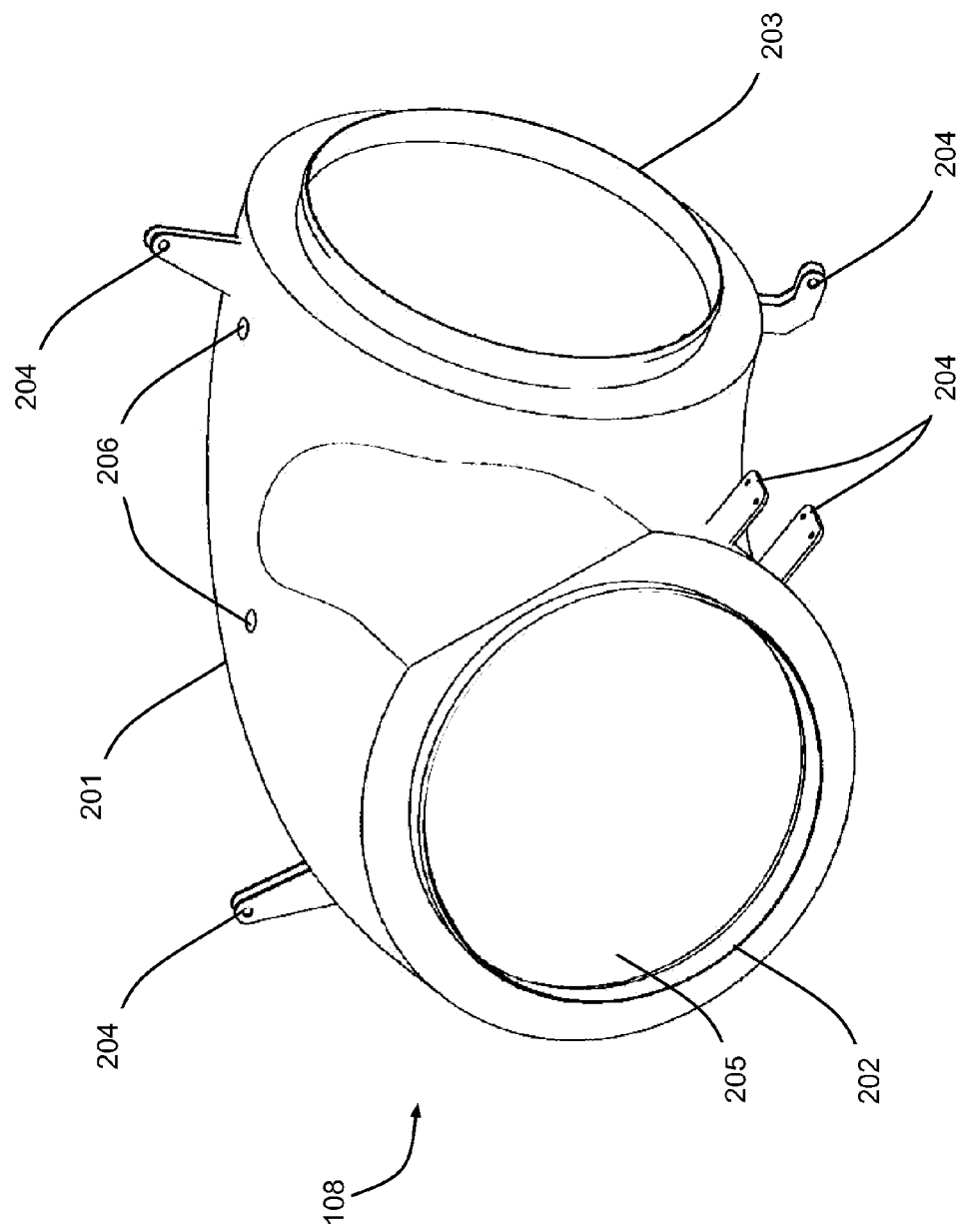
FIG. 2 is an isometric view of an exhaust silencer in the air conditioning system of FIG. 1.

With reference to FIG. 2, each silencer 108 comprises an outer casing 201, which provides a pressure vessel. The outer casing 201 comprises an inlet port 202 and an outlet port 203 for connection to the output of the AC plant 106 and the RAM air outlet respectively. The outer casing 201 is provided with a set of anchor points 204 for fixing the silencer 108 to the surrounding aircraft structure. An inner casing 205 is located inside the outer casing and situated between the inlet port 202 and the outlet port 203. The inner casing 205 provides a conduit for the waste hot air between the inlet port 202 and the outlet port 203. In the present embodiment, the inner casing 205 is formed from an aircraft grade metal in the form of a titanium alloy. The wall of the inner casing 205 is perforated so as to permit fluid communication through the wall of the inner casing 205. The inner casing 205 functions as a baffle. The outer casing 201 is further provided with fixing points 206 for fixing the inner casing 205 to the outer casing as described in further detail below. Thus, the inner casing 205 is fixed within the outer casing 201 by means of the fixing points 206 and the location or capture of the inner casing 205 between the inlet port 202 and the outlet port 203 of the outer casing 201 as described in further detail below.

Figure 3:
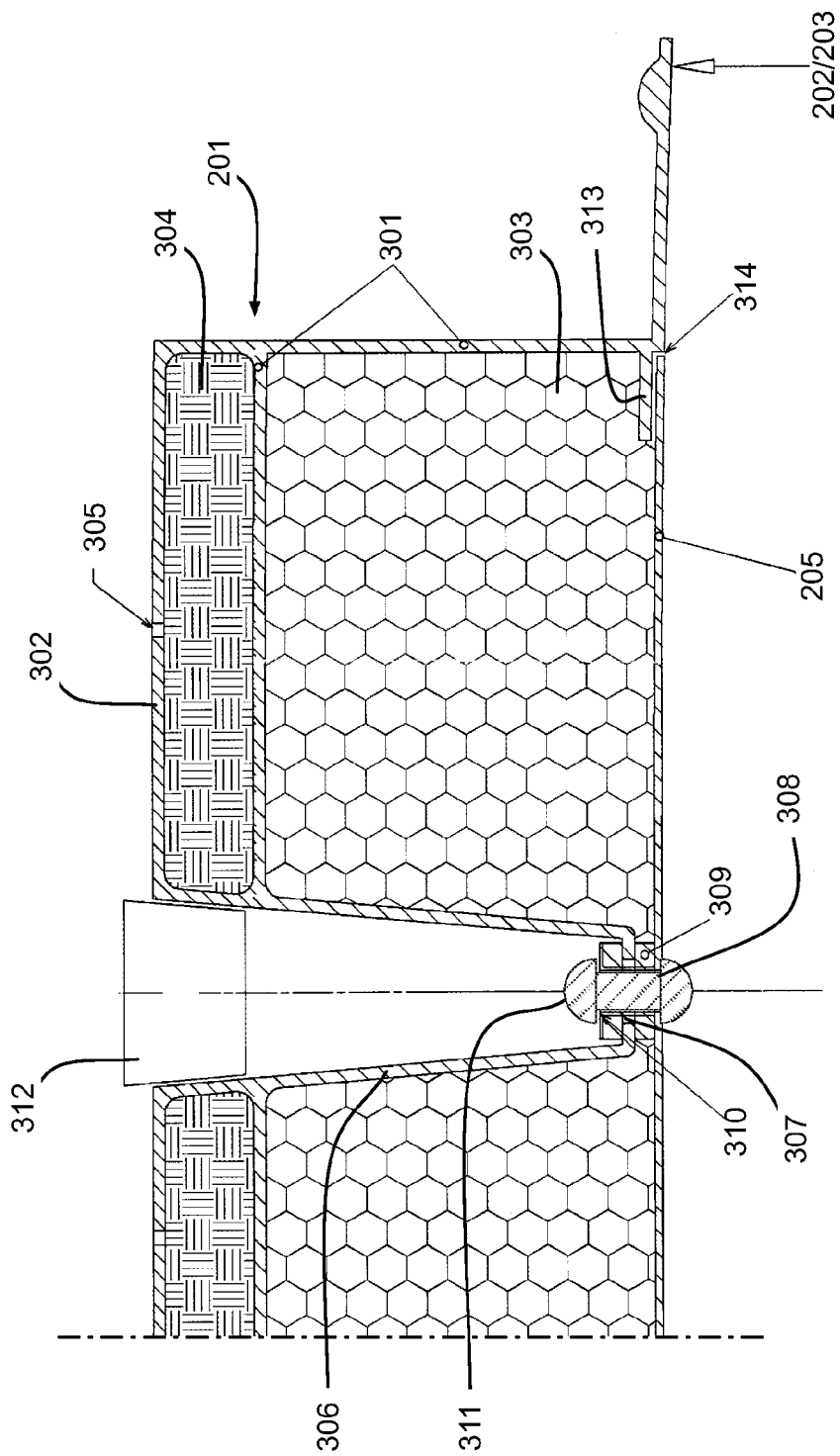
FIG. 3 is a detailed cross-sectional view of a part of the exhaust silencer of FIG. 2.

With reference to FIG. 3, the outer casing 201 is formed from a synthetic composite material, which, in the present embodiment, is a carbon fibre reinforced plastic (CFRP). The CFRP is selected so as to be stable at the high temperatures experienced during operation of the silencer 108. The outer casing comprises an inner wall 301 and an outer wall 302. The inner wall comprises the pressure wall for the silencer pressure vessel and is thus fluid-tight except for the inlet port 202 and the outlet port 203. The void provided between the inner wall 301 and the inner casing 205 is filled with an acoustic insulation material 303 arranged to attenuate the noise of the exhaust airflow. The void provided between the inner wall 301 and the outer wall 302 is filled with a thermal insulation material 304 arranged to insulate the exterior of the silencer 108 from the heat of the exhaust airflow. The outer wall 302 is provided with holes 305 arranged to provide a leak flow path from void between the inner wall 301 and the outer wall 302 to the exterior of the silencer 108. Such leak flow paths are provided in order to enable over-heat detection systems (not shown) to detect leakage or overheating of the silencer 108.

In the present embodiment, the fixing points 206 are each provided in the form of a socket 306 formed though outer and inner walls 302, 301. The socket 306 is formed as a truncated cone shape that converges to a position adjacent the inner casing 205. The inner end of the socket 306 is provided with a first aperture 307. The first aperture 307 corresponds to a second aperture 308 in the inner casing 205. A grommet 309 is fitted in the first aperture 307 and arranged to seat between the inner end of the socket 306 and the outer surface of the inner casing 205. The grommet 309 if formed from a flexible resilient heat resistant material. The grommet 309 is lined with a collar 310 arranged to limit the compression of the grommet 309. Fixing means 311, in the form of a rivet, is fixed through the first and second apertures 307, 308 so as to compress the grommet 309 and fix the outer casing 201 to the inner casing 205. The outer open end of the socket 306 is sealed with a plug 312.

The outer casing 201 comprises an annular flange 313 adjacent each of the inlet port 202 and the outlet port 203. The flanges 313 are arranged to provide an expansion joint between the outer ends of the inner casing 205 adjacent the inlet port 202 and the outlet port 203. In the present embodiment, the expansion joint is thus provided in the form of a joggle joint.

Figure 4:
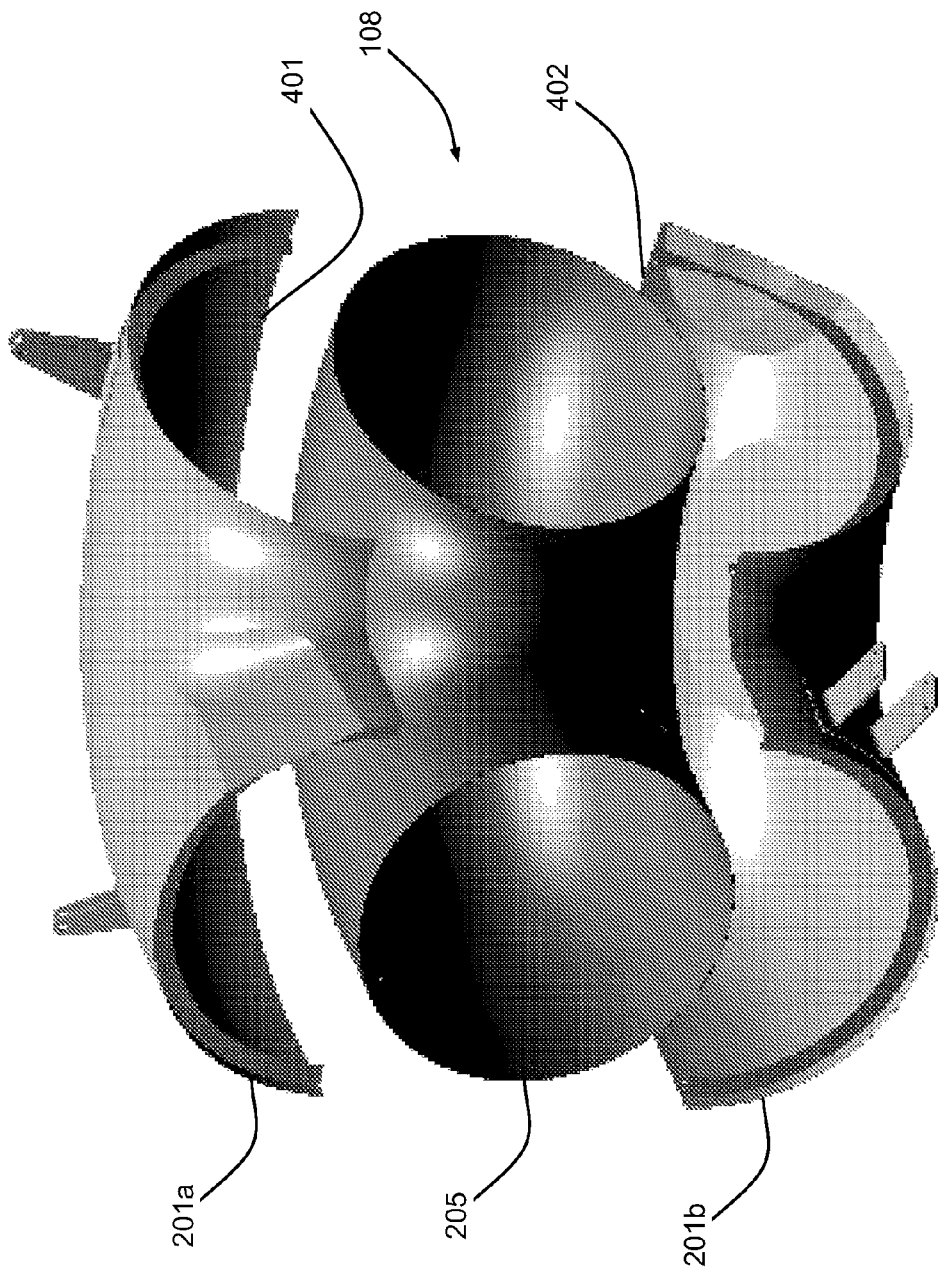
FIG. 4 is an exploded isometric view of the exhaust silencer of FIG. 2.

With reference to FIG. 4, in the present embodiment, the outer casing 201 is constructed in two halves 201a, 201b and the inner casing 205 is constructed as a singe piece. The silencer 108 is assembled by joining the two halves 201a, 201b of the outer casing 201 around the inner casing 205. The respective mating surfaces 401, 402 of each half of two the outer casings 201a, 201b are provided with complementary joints in the form of joggle joints. The joggle joints provide overlapping surfaces that are then fixed together by bonding.

Figure 5:
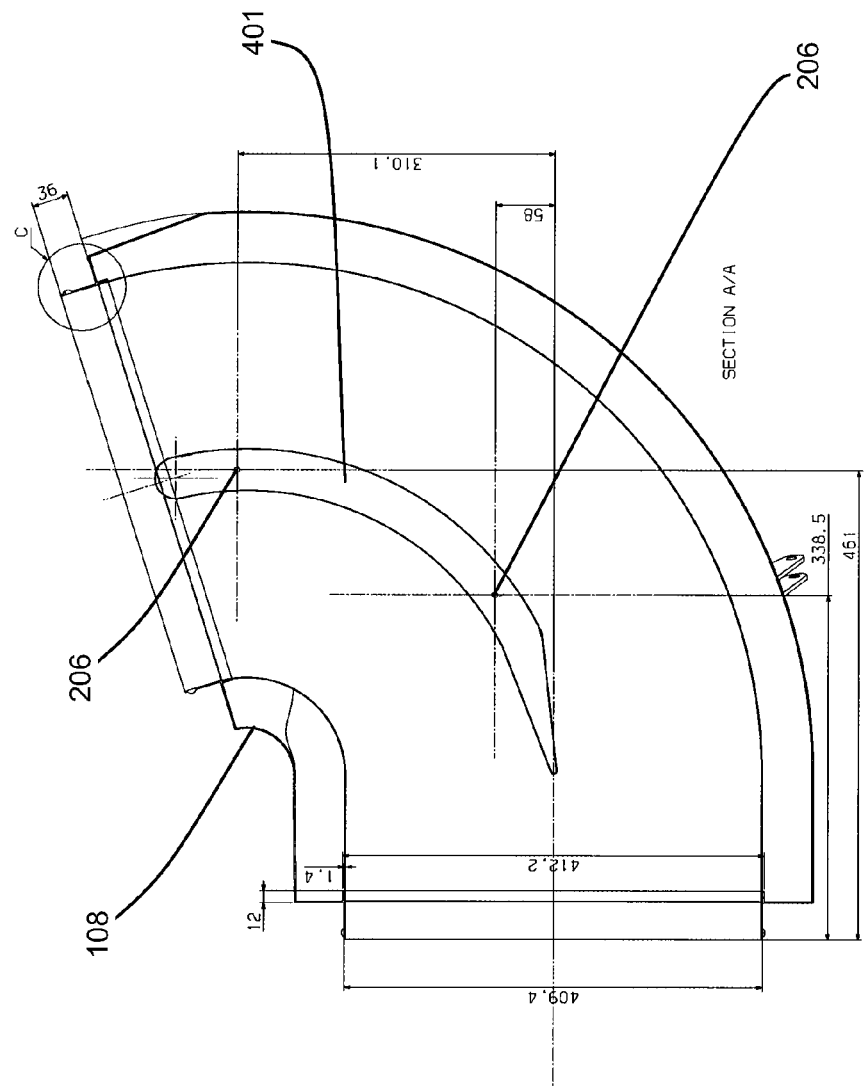
FIG. 5 is a cross-sectional plan view of another embodiment of an exhaust silencer for the AC system of FIG. 1.

In a further embodiment, with reference to FIG. 5, the silencer 108 is provided with an internal guide vane 501 for directing the AC exhaust airflow through the conduit provided by the inner casing 205. In the present embodiment, the silencer 108 is provided with four fixing points 206 which are used for fixing the inner and outer casings 201, 205 to each other and, in addition, for fixing the vane 501 within the silencer 108. Thus the fixing means 311 is extended to fix through corresponding apertures in the vane 501.

In another embodiment, the joint 314 between the inner and outer casings 201, 205 is bonded with a heat resistant flexible adhesive so as to provide a sealed expansion joint.

As will be understood by those skilled in the art, the silencer may be arranged to take up any suitable shape or configuration required by a given application. For example, the silencer may comprise one or more bends of any suitable degree, or may be straight or provide a tee.

As will be understood by those skilled in the art, the synthetic composite material for the outer casing, the metal for the inner casing and the bonding and jointing materials selected for embodiments of the invention may be varied from those described herein in accordance with any given application thereof.

As will be understood by those skilled in the art, any suitable form or construction of joint may be provided between the inner and outer casings adjacent the input and output ports and arranged to tolerate the heat and resulting thermal movement required for a given application of the silencer.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. An air conditioning exhaust silencer for an aircraft, said silencer comprising:
   a pressure vessel having an input port and an output port, said pressure vessel being formed from high temperature synthetic composite material;
   a perforated conduit running through said pressure vessel between said input port and said output port;
   an acoustic absorption layer arranged between the outer surface of said perforated conduit and the interior surface of said pressure vessel; and
   a thermal insulation layer arranged exterior to said pressure vessel.

2. An air conditioning exhaust silencer according to claim 1 in which said perforated conduit is formed from high temperature metal alloy.

3. An air conditioning exhaust silencer according to claim 1 in which the wall of said pressure vessel comprises a cavity and said thermal layer is arranged within said cavity.

4. An air conditioning exhaust silencer according to claim 3 in which said cavity comprises one or more vents arranged to provide fluid communication between the interior of said cavity and the exterior of said pressure vessel so as to provide a leak path.

5. An air conditioning exhaust silencer according to claim 1 in which said perforated conduit is fixed to said pressure vessel at a first joint adjacent said input port and a second joint adjacent said output port.

6. An air conditioning exhaust silencer according to claim 5 in which said first or second joints comprise expansion joints.

7. An air conditioning exhaust silencer according to claim 1 in which one or more fixing points are provided for fixing said pressure vessel to said perforated conduit.

8. An air conditioning exhaust silencer according to claim 7 in which said fixing points are provided by an inward diversion of the wall of said pressure vessel to adjacent said perforated conduit so as to enable said fixing of said pressure vessel to said perforated conduit.

9. An air conditioning exhaust silencer according to claim 7 in which said fixing points each comprise an expansion joint.

10. An air conditioning exhaust silencer according to claim 8 in which said inward diversion of said wall is provided with sealing means arranged to provide fluid sealing between said fixing point and the exterior of said pressure vessel.

11. An air conditioning exhaust silencer according to claim 1 comprising one or more guide vanes arranged within said perforated conduit for guiding fluid flow through said air conditioning exhaust silencer.

12. An air conditioning exhaust silencer according to claim 11 in which in which one or more fixing points are provided between said input port and said output port for fixing said pressure vessel to said perforated conduit in combination with fixing the or each vane within said air conditioning exhaust silencer.

13. An air conditioning exhaust silencer according to claim 1 in which said pressure vessel is formed from a plurality of parts fixed together around said perforated conduit.

\* \* \* \* \*